United States Patent
Hwang et al.

(10) Patent No.: US 9,174,543 B2
(45) Date of Patent: Nov. 3, 2015

(54) MANGANESE OXIDE/GRAPHENE NANOCOMPOSITE AND PRODUCING METHOD OF THE SAME

(71) Applicant: EWHA UNIVERSITY—INDUSTRY COLLABORATION FOUNDATION, Seoul (KR)

(72) Inventors: Seong-Ju Hwang, Seoul (KR); Dayoung Sung, Seoul (KR)

(73) Assignee: EWHA UNIVERSITY—INDUSTRY COLLABORATION FOUNDATION (KR)

( * ) Notice: Subject to any disclaimer, the term of this patent is extended or adjusted under 35 U.S.C. 154(b) by 460 days.

(21) Appl. No.: 13/630,656

(22) Filed: Sep. 28, 2012

(65) Prior Publication Data

US 2013/0161570 A1 Jun. 27, 2013

(30) Foreign Application Priority Data

Dec. 22, 2011 (KR) ........................ 10-2011-0140298

(51) Int. Cl.
| | |
|---|---|
| *H01B 1/04* | (2006.01) |
| *C01G 45/12* | (2006.01) |
| *B82Y 40/00* | (2011.01) |
| *B60L 11/00* | (2006.01) |
| *H01B 1/18* | (2006.01) |
| *B60L 11/18* | (2006.01) |

(Continued)

(52) U.S. Cl.
CPC ............ *B60L 11/005* (2013.01); *B60L 11/1879* (2013.01); *C01G 45/02* (2013.01); *H01B 1/18* (2013.01); *B82Y 30/00* (2013.01); *B82Y 40/00* (2013.01); *C01P 2002/72* (2013.01); *C01P 2004/03* (2013.01); *C01P 2004/04* (2013.01); *C01P 2004/20* (2013.01); *C01P 2006/12* (2013.01); *Y02T 10/7005* (2013.01); *Y02T 10/705* (2013.01); *Y02T 10/7022* (2013.01)

(58) Field of Classification Search
CPC .. H01B 1/00–1/04; C01G 45/12; B82Y 40/00
USPC ........... 252/500–519.1; 423/445 R, 448, 460, 423/599; 977/734, 810, 847
See application file for complete search history.

(56) References Cited

U.S. PATENT DOCUMENTS

| | | | |
|---|---|---|---|
| 2011/0033746 A1* | 2/2011 | Liu et al. ....................... | 429/209 |
| 2013/0029233 A1* | 1/2013 | Lee et al. ...................... | 429/405 |
| 2013/0168611 A1* | 7/2013 | Zhou et al. .................... | 252/506 |

FOREIGN PATENT DOCUMENTS

KR   10-2010-0037689   4/2010

OTHER PUBLICATIONS

Devaraj et al. ("Effect of Crystallographic Structure of MnO2 on Its Electrochemical Capacitance Properties." JPC C, 112, pp. 4406-4417, online Feb. 26, 2008).*

(Continued)

*Primary Examiner* — Tri V Nguyen
(74) *Attorney, Agent, or Firm* — Brundidge & Stanger, P.C.

(57) ABSTRACT

The present disclosure provides a method for producing a manganese oxide/graphene nanocomposite including synthesizing a manganese oxide/graphene nanocomposite through liquid phase reaction at a room temperature, a manganese oxide/graphene nanocomposite produced by the method, and an electrode material and a super-capacitor electrode including the manganese oxide/graphene nanocomposite.

9 Claims, 17 Drawing Sheets

(51) Int. Cl.
*C01G 45/02* (2006.01)
*B82Y 30/00* (2011.01)

(56) References Cited

OTHER PUBLICATIONS

Chen et al. ("Graphene Oxide—MnO2 Nanocomposites for Supercapacitors." ACS Nano, 4(5), pp. 2822-2830, online Apr. 12, 2010).*

Li et al. (Synthesis of hydrothermally reduced graphene/MnO2 composites and their electrochemical properties as supercapacitors. J Power Sources, 196, pp. 8160-8165, online May 27, 2011).*

Liu et al. (Synthesis, characterization and magnetic properties of B—MnO2 nanorods. Powder Tech, 154, pp. 120-124, online Jun. 23, 2005).*

H. Xia et al.: "Facile Synthesis of Novel Nanostructured MnO2 Thin Films and Their Application in Supercapacitors", Nanoscale Res. Lett, (2009), vol. 4, pp. 1035-1040, Jun. 2, 2009.

Yong Qian et al.: "Preparation of MnO2/graphene composite as electrode material for supercapacitors", J. Mater Sci. (2011), vol. 46, pp. 3517-3522, Jan. 14, 2011.

Sung et al., Accelerated Formation of Electrochemically Active $\delta$-$MnO_2$ Nanoplates by the Incorporation of Graphene Nanosheets, The 108th Autumn Meeting of the Korean Chemical Society, Sep. 28, 2011.

Sung et al., Beneficial Effect of Graphene Incoropration on the Formation Rate and Electrode Performance of $\delta$-$MnO_2$ Nanoplates, The 2011 Autumn Meeting of the Korean Electrochemical Society, Oct. 6, 2011.

* cited by examiner

MANGANESE OXIDE/GRAPHENE NANOCOMPOSITE AND PRODUCING METHOD OF THE SAME

CROSS-REFERENCE TO RELATED APPLICATION

This application claims the benefit of Korean Patent Application No. 10-2011-0140298 filed on Dec. 22, 2011, the entire disclosures of which are incorporated herein by reference.

FIELD OF THE INVENTION

The present disclosure relates to a manganese oxide/graphene nanocomposite, a method for producing the manganese oxide/graphene nanocomposite, and an electrode material and a super-capacitor electrode including the manganese oxide/graphene nanocomposite.

BACKGROUND OF THE INVENTION

Recently, with the invention of electric vehicles and hybrid vehicles, the importance of a super-capacitor, which is used as a power supply device together with a lithium secondary cell, has been emphasized. Thus, researches are being actively conducted to develop a super-capacitor, which is small and light and has a high-output and high-capacity performance. Materials that have been researched for a super-capacitor electrode include carbons, metal oxides, conductive polymers, and others. Especially, the metal oxide is advantageous because it exhibits larger specific capacitance than that of other electrode materials by virtue of the additional Faraday reaction between the electrode material and an electrolyte. Among the metal oxides, a ruthenium oxide was the first material that had been researched as an electrode material over a long period of time. The ruthenium oxide has recorded significantly high specific capacitance over other metal oxides. However, due to a small preservation amount of a precursor and a high price, there have been demands for a research of development of an alternative metal oxide.

Especially, a manganese oxide has drawn attentions as an electrode material, which can satisfy the high specific capacitance of the ruthenium oxide and substitute the ruthenium oxide by virtue of a large preservation amount of a precursor, a low price, and easiness in synthesis. In spite of these advantages, however, since the manganese oxide has low electrical conductivity, there is limitation in actually utilizing the manganese oxide. In order to overcome the limitation, many researchers have focused on improving the characteristic of the manganese oxide as an electrode material by mixing the manganese oxide with a material having high electrical conductivity. Among various possible materials, graphene is a material formed of one carbon atomic layer and having a two-dimensional plane structure. Such graphene has many excellent physical properties including high electrical conductivity. Thus, in addition to researches on the graphene material itself, many researches on use of the graphene as an electrode material by mixing the graphene with a transition metal oxide including a manganese oxide are being conducted.

With respect to one of the most critical factors in selecting an electrode material forming an electrode, an electrode material should have many active surfaces exposed by a large specific surface area. This factor is related to a diffusion velocity of ions of an electrolyte and expansion of an accessible surface. Eventually, the factor is related to high specific capacitance. Accordingly, many researches are being conducted as to evaluation of applicability of a metal oxide in a 1D or 2D structure having a much large surface area compared to a bulk phase as an electrode material for the capacitor.

Other several researches have reported methods for synthesizing the manganese oxide and a nanocomposite. Most of the synthesis methods being currently used relate to supply an external power by using an electrodeposition method, hydrothermal synthesis, or others (Korean Patent Application Publication No. 10-2010-0037689) or require a condition of high temperature and high pressure and a special equipment. Thus, the synthesis methods are vulnerable in the aspects of energy and economy.

BRIEF SUMMARY OF THE INVENTION

The present disclosure provides a method for producing a manganese oxide/graphene nanocomposite including synthesizing a manganese oxide/graphene nanocomposite through liquid phase reaction at a room temperature, a manganese oxide/graphene nanocomposite produced by the method, and an electrode material and a super-capacitor electrode including the manganese oxide/graphene nanocomposite.

However, the technical problems sought to be solved by the present disclosure are not limited to the foregoing problems. Other technical problems, which are sought to be solved by the present disclosure but are not described in this document, can be clearly understood by those skilled in the art of the present disclosure from the descriptions below.

A first aspect of the present disclosure provides a method for producing a manganese oxide/graphene nanocomposite including causing liquid phase reaction of a manganese precursor and graphene.

A second aspect of the present disclosure provides a manganese oxide/graphene nanocomposite produced by the first aspect of the present disclosure.

A third aspect of the present disclosure provides an electrode material including the manganese oxide/graphene nanocomposite of the second aspect of the present disclosure.

A fourth aspect of the present disclosure provides a super-capactior electrode including the manganese oxide/graphene nanocomposite of the second aspect of the present disclosure.

The manganese oxide/graphene nanocomposite of the present disclosure can be easily synthesized through a room temperature synthesis method under a condition of a low temperature and a low pressure without requiring a special equipment, materials, or a surfactant. Thus, compared to a conventional nanocomposite synthesis method, the manganese oxide/graphene nanocomposite of the present disclosure is excellent in terms of economics and easiness. In the present disclosure, it is possible to more effectively synthesize the nanocomposite by using graphene by drastically reducing the long reaction time that is a vulnerable point of the conventional nanocomposite room temperature synthesis method. Furthermore, since the manganese oxide/graphene nanocomposite of the present disclosure exhibits an excellent specific surface area value and an excellent capacitance value, it exhibits excellent activity as a super-capacitor electrode.

BRIEF DESCRIPTION OF THE DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which.

DETAILED DESCRIPTION OF THE INVENTION

Figure 1:
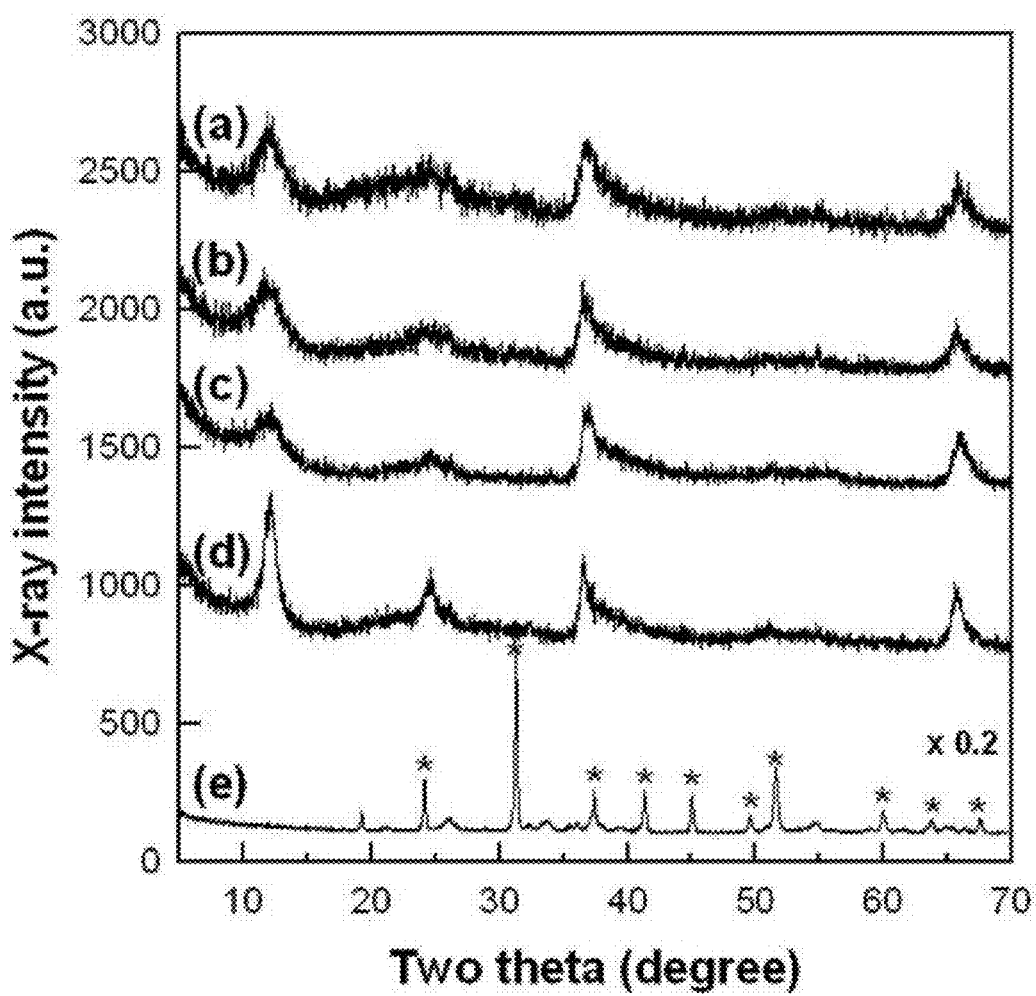
FIG. 1 is a powder X-ray diffraction graph of a manganese oxide/graphene nanocomposite in accordance with an illustrative embodiment of the present disclosure.

Hereinafter, illustrative embodiments and examples of the present disclosure will be described in detail with reference to the accompanying drawings so that inventive concept may be readily implemented by those skilled in the art.

However, it is to be noted that the present disclosure is not limited to the illustrative embodiments and the examples but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element.

Throughout the whole document, the term "on" that is used to designate a position of one element with respect to another element includes both a case that the one element is adjacent to the another element and a case that any other element exists between these two elements.

Throughout the whole document, the term "comprises or includes" and/or "comprising or including" used in the document means that one or more other components, steps, operations, and/or the existence or addition of elements are not excluded in addition to the described components, steps, operations and/or elements.

The terms "about or approximately" or "substantially" in this document are intended to have meanings close to numerical values or ranges specified with an allowable error and intended to prevent accurate or absolute numerical values disclosed for understanding of the present invention from being illegally or unfairly used by any unconscionable third party. Throughout the whole document, the term "step of" does not mean "step for".

Throughout the whole document, the term "combination of" included in Markush type description means mixture or combination of one or more components, steps, operations and/or elements selected from the group consisting of components, steps, operation and/or elements described in Markush type and thereby means that the disclosure includes one or more components, steps, operations and/or elements selected from the Markush group.

Hereinafter, a manganese oxide/graphene nanocomposite, a method for producing the manganese oxide/graphene nanocomposite, and an electrode material and a super-capacitor electrode including the manganese oxide/graphene nanocomposite in the present disclosure will be described in detail with reference to illustrative embodiments, examples, and drawings. However, the present disclosure is not limited thereto.

The method for producing a manganese oxide/graphene nanocomposite in accordance with the first aspect of the present disclosure may include a step of causing liquid phase reaction of a manganese precursor and graphene. However, the present disclosure is not limited thereto. The terms "manganese oxide/graphene nanocomposite" used throughout the document means a nanocomposite of a manganese oxide and graphene, in which the manganese oxide and the graphene may be mixed with each other to form a composite in a nano size. However, the present disclosure is not limited thereto.

In an illustrative embodiment of the present disclosure, the production method may include, but not limited to, a step of mixing, and then, reacting the manganese precursor and graphene colloid to obtain a reaction solution; and a step of adding an oxidizer to the reaction solution to react the reaction solution with the oxidizer.

In an illustrative embodiment of the present disclosure, the manganese precursor and the graphene colloid may be mixed, and then, reacted at a temperature of about 0° C. to about 50° C., about 0° C. to about 40° C., about 0° C. to about 30° C., about 10° C. to about 50° C., about 10° C. to about 40° C., about 10° C. to about 30° C., about 20° C. to about 50° C., or about 20° C. to about 40° C. For example, the manganese precursor and the graphene colloid may be reacted at a room temperature (about 25° C.). However, the present disclosure is not limited thereto.

In an illustrative embodiment of the present disclosure, the manganese precursor may include, but not limited to, a precursor containing divalent manganese, e.g., a precursor selected from the group consisting of $MnCO_3$, $MnO$, $MnSO_4$, $MnNO_3$ and combinations thereof.

In an illustrative embodiment of the present disclosure, the oxidizer may include, but not limited to, one selected from a group consisting of $(NH_4)_2S_2O_8$, $Li_2S_2O_8$, $Na_2S_2O_8$, $K_2S_2O_8$ and combinations thereof.

In an illustrative embodiment of the present disclosure, the production method may further include, but not limited to, a step of centrifuging the reaction solution reacted by adding the oxidizer to wash the reacted manganese oxide/graphene nanocomposite.

In an illustrative embodiment of the present disclosure, the production method may further include, but not limited to, a step of drying the reacted manganese oxide/graphene nanocomposite after the step of centrifuging.

In an illustrative embodiment of the present disclosure, the oxidizer may be added at a mole ratio of about 1: about 1 to about 5, e.g., a mole ratio of about 1: about 2.8, with respect to the manganese precursor. However, the present disclosure is not limited thereto.

In an illustrative embodiment of the present disclosure, the graphene may be, but not limited to, a pristine graphene, a reduced graphene oxide (RGO), or a combination thereof.

In an illustrative embodiment of the present disclosure, the manganese oxide of the manganese oxide/graphene nanocomposite may include, but not limited to, $\delta$-$MnO_2$.

In an illustrative embodiment of the present disclosure, the manganese oxide/graphene nanocomposite may be, but not limited to, in a plate shape.

The second aspect of the present disclosure can provide a manganese oxide/graphene nanocomposite produced by the method of the first aspect of the present disclosure.

The third aspect of the present disclosure can provide an electrode material including the manganese oxide/graphene nanocomposite of the second aspect of the present disclosure.

The fourth aspect of the present disclosure can provide a super-capacitor electrode including the manganese oxide/graphene nanocomposite of the second aspect of the present disclosure.

EXAMPLES

Example 1

Production of a Manganese Oxide/Graphene Nanocomposite

As reactants, $MnCO_3$, which is a divalent manganese precursor, and an oxidizer $(NH_4)_2S_2O_8$ were used. As the graphene to be added to the reaction, graphene, which is synthesized through a Hummers method and colloidal, was used. Below is the detailed synthesis method.

0.8912 g of $MnCO_3$, which is a precursor material of a manganese oxide nano-structure, was added to 0 ml, 10 ml, 30 ml, 60 ml, and 100 ml of graphene colloids and reacted sufficiently. In that time, a total volume of a solvent was adjusted to be 60 ml by using distilled water. However, in the specimen, in which 100 ml of the graphene colloid was added, the total volume of the solvent was adjusted to be 100 ml corresponding to the volume of the solvent for the colloid. The specimen, in which no graphene colloid (0 ml) was added, is a comparative example and was used for characteristic analysis afterward. When the two materials were sufficiently reacted so that precipitate was generated, the oxidizer $(NH_4)_2S_2O_8$ was added thereto such that the mole ratio of the precursor: $(NH_4)_2S_2O_8$ is 1:2.8 and then stirred at a room temperature (25° C.) during reaction. As to reaction times, in the case where no graphene colloid was added, the precursor was reacted with the oxidizer for one day. In the case where 10 ml of the graphene colloid was added, the precursor was reacted with the oxidizer for 5 hours. In the case where 30 ml of the graphene colloid was added, the precursor was reacted with the oxidizer for 2 hours. In the case where 60 ml of the graphene colloid was added, the precursor was reacted with the oxidizer for 1 hour and 30 minutes. In the case where 100 ml of the graphene colloid was added, the precursor was reacted with the oxidizer for one hour. The precipitate generated after the reaction was obtained through centrifugation for 10 minutes at 14,000 rpm. In order to remove remaining ions, the precipitate was washed with distilled water and dried in an oven of 50° C. for at least one day.

Example 2

Production of an Electrode Including a Manganese Oxide/Graphene Nanocomposite

The manganese oxide/graphene nanocomposite of Example 1, acetylene black, and PVD were mixed at a ratio of 75:20:5 (wt %). Thereafter, 1 ml to 2 ml of a N-methylpyrrolidone solution was added thereto to prepare an electrode material in a slurry state. The slurry, in which the material was properly dispersed through sufficient ultrasonic wave processing and stirring, was coated on a stainless steel plate by using a doctor blade method. After being dried in a vacuum oven of 80° C. for one or two hours, the electrode material and the stainless steel plate were compressed at a pressure of 10 MPa. In order to measure cells, the compressed plate was immersed in an electrolyte solution for 3 hours. As the electrolyte solution, a 0.2 M $Na_2SO_4$ aqueous solution was used.

Experimental Example 1

Characteristic Analysis

Crystal structures and crystal forms of the manganese oxide/graphene nanocomposite of Example 1 and the manganese oxide of the comparative example were analyzed by performing powder X-ray diffraction (XRD). The results were illustrated in FIG. 1. The crystal forms of the manganese oxide/graphene nanocomposite of Example 1 and the comparative example were analyzed through scanning electron microscopy analysis and transmission electron microscopy (TEM) analysis. The results were illustrated in FIGS. 2 and 3, respectively. Specific surface areas and porous structures of the manganese oxide/graphene nanocomposite of Example 1 and the comparative example were analyzed through a nitrogen isotherm adsorption and desorption test at 77K. The results were illustrated in FIG. 4.

FIG. 1 is a powder X-ray diffraction graph for a product obtained by adding 0 ml, 10 ml, 30 ml, 60 ml, and 100 ml of graphene colloids to the manganese precursor $MnCO_3$, and then, reacting the precursor with the oxidizer for 1 to 24 hours. (a) shows an XRD result for a product obtained by adding 100 ml of the graphene colloid, and then, reacting the precursor with the oxidizer for 1 hour. (b) shows an XRD result for a product obtained by adding 60 ml of the graphene colloid, and then, reacting the precursor with the oxidizer for 1 hour and 30 minutes. (c) shows an XRD result for a product obtained by adding 30 ml of the graphene colloid, and then, reacting the precursor with the oxidizer for 2 hours. (d) shows an XRD result for a product obtained by adding 10 ml of the graphene colloid, and then, reacting the precursor with the oxidizer for 5 hours. (e) shows an XRD result for a product (comparative example) obtained by only reacting the oxidizer and the manganese precursor $MnCO_3$ for 5 hours without adding the graphene colloid. In the case where $MnCO_3$ and the oxidizer were reacted for 5 hours without adding the graphene colloid (comparative example), an XRD diffraction pattern of the divalent precursor $MnCO_3$ was mostly seen as it was. To the contrary, in the case where 10 ml of the graphene colloid was added, and then, reacted with the oxidizer, the precursor was completely oxidized within 5 hours, and $\delta$-$MnO_2$ was generated. In the graphs (a) to (d), it was identified that as the content of the graphene increases to 10 ml, 30 ml, 60 ml, and 100 ml, the time required to generate $\delta$-$MnO_2$ is reduced. In light of these results, it is understood that the addition of the graphene colloid promotes the generation of $\delta$-$MnO_2$.

Figure 2A:
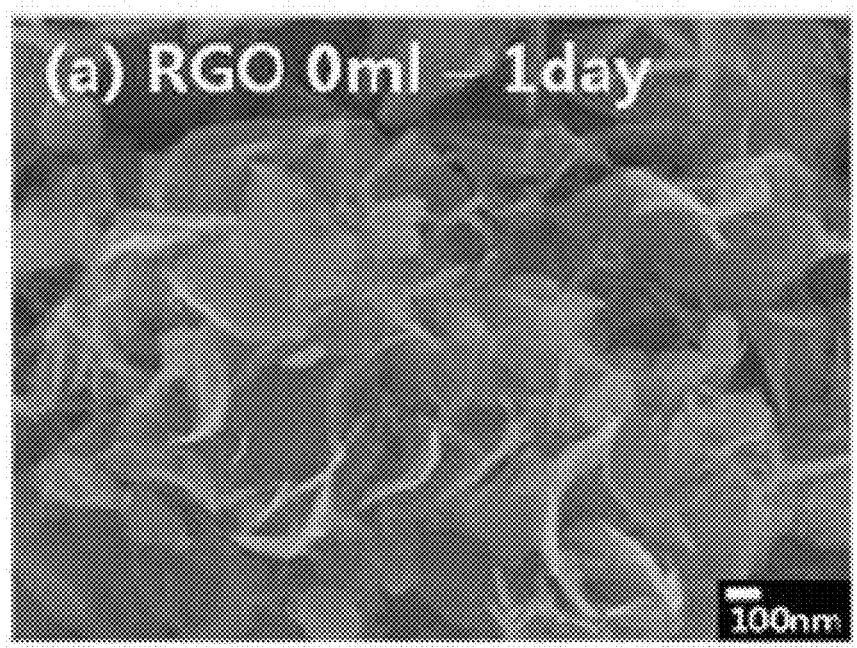
FIGS. 2A to 2E provide scanning electron microphotographs of a manganese oxide/graphene nanocomposite in accordance with an illustrative embodiment of the present disclosure.
Figure 2B:
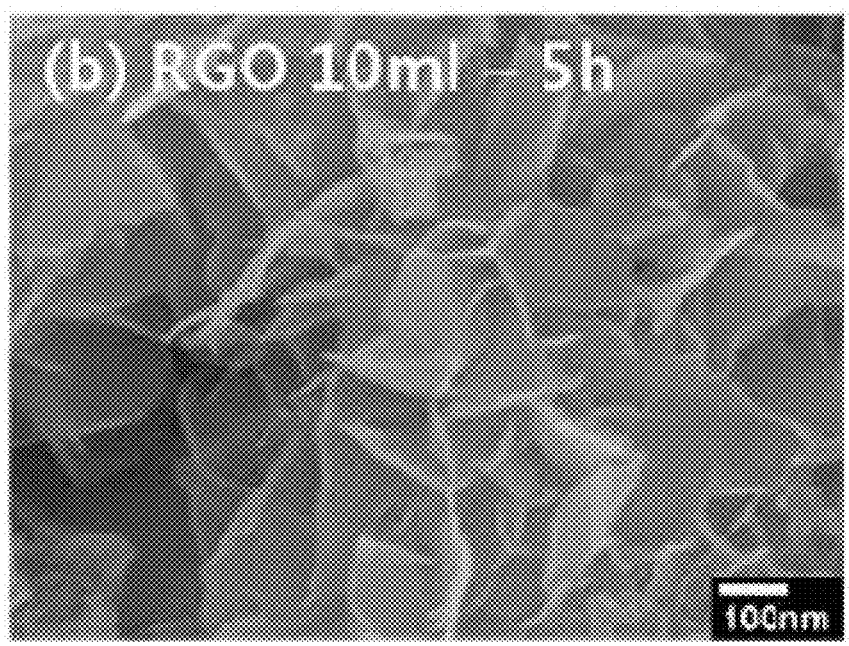
Figure 2C:
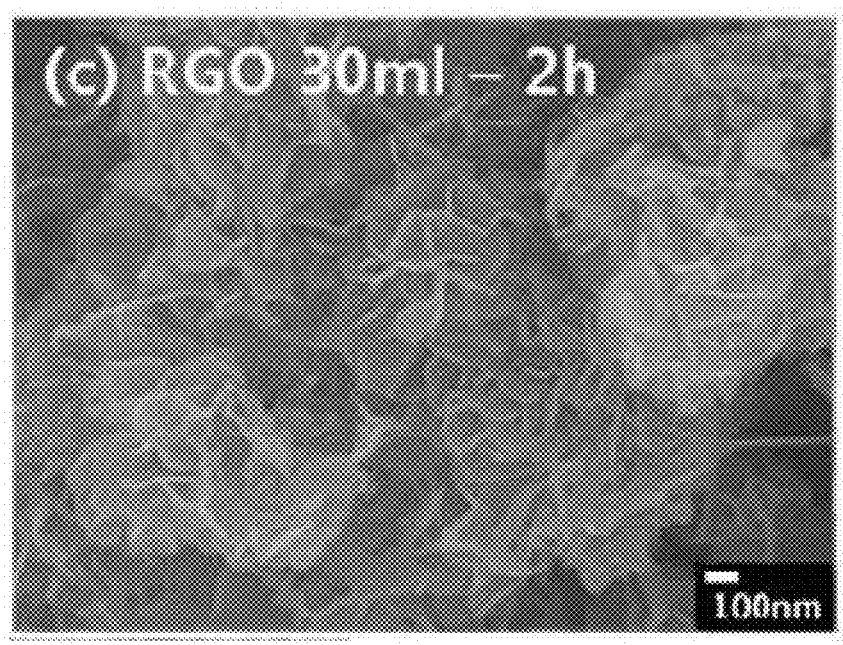
Figure 2D:
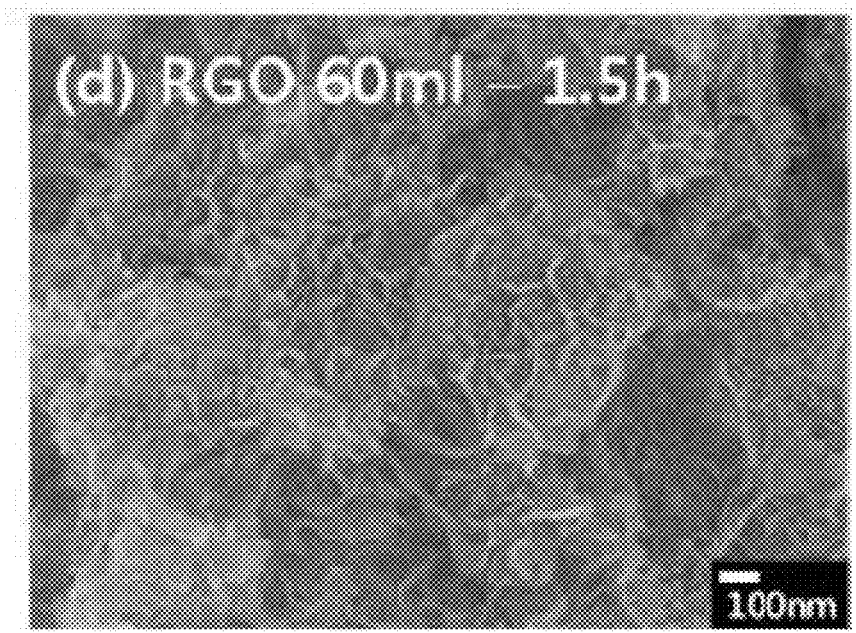
Figure 2E:
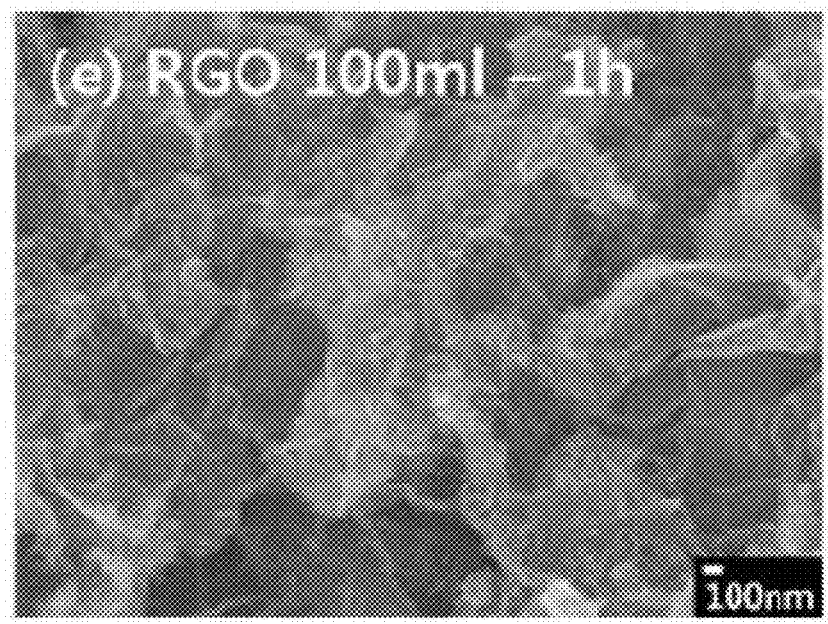

FIGS. 2A to 2E provide scanning electron microphotographs of products obtained by adding 0 ml, 10 ml, 30 ml, 60 ml, and 100 ml of graphene colloids to the manganese precursor $MnCO_3$, and then, reacting the precursor with the oxidizer for 1 to 24 hours. FIG. 2A shows a SEM image of a product (comparative example) obtained by only reacting the oxidizer and the manganese precursor for 24 hours without adding the graphene colloid. FIG. 2B shows a SEM image of a product obtained by adding 10 ml of the graphene colloid, and then, reacting the precursor with the oxidizer for 5 hours. FIG. 2C shows a SEM image of a product obtained by adding 30 ml of the graphene colloid, and then, reacting the precursor with the oxidizer for 2 hours. FIG. 2D shows a SEM image of a product obtained by adding 60 ml of the graphene colloid, and then, reacting the precursor with the oxidizer for 1.5 hours. FIG. 2E shows a SEM image of a product obtained by adding 100 ml of the graphene colloid, and then, reacting the precursor with the oxidizer for 1 hour. As shown in FIG. 2A, δ-$MnO_2$ is in a plate shape having a thickness of 10 nm to 20 nm and a side surface length of ~200 nm. FIG. 2B to FIG. 2E are images of δ-$MnO_2$ synthesized by adding the graphene colloid. It was identified that δ-$MnO_2$ in the plate shape was properly formed for the respective reaction times in FIG. 2B to FIG. 2E. A relatively long reaction time is required to synthesize a manganese oxide nano-structure by reacting only a divalent manganese precursor bulked with the oxidizer at a room temperature. However, if the graphene is added, even if an amount of the graphene to be added is small, the reaction time required to form a manganese oxide in a nano size is drastically reduced. This effect increases as the amount of the graphene to be added increases. Thus, it can be found out that the graphene functions as a catalyst in forming the manganese oxide nano-structure and contributes to effectively reducing the reaction time.

Figure 3A:
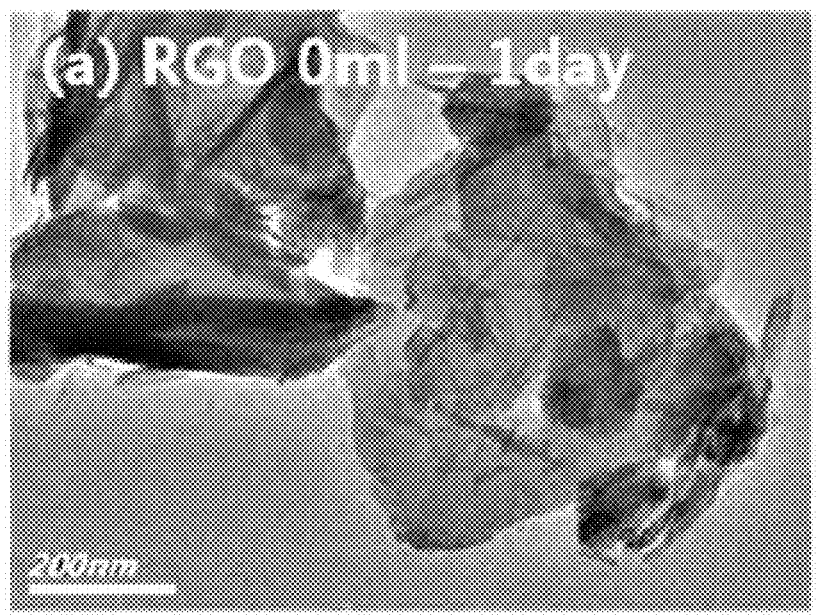
FIGS. 3A to 3E provide transmission electron microphotographs of a manganese oxide/graphene nanocomposite in accordance with an illustrative embodiment of the present disclosure.
Figure 3B:
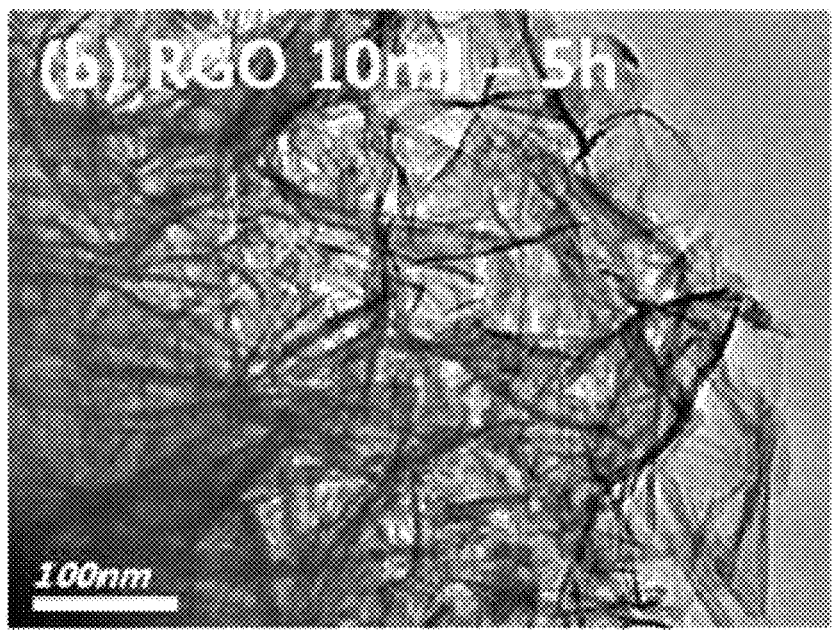
Figure 3C:
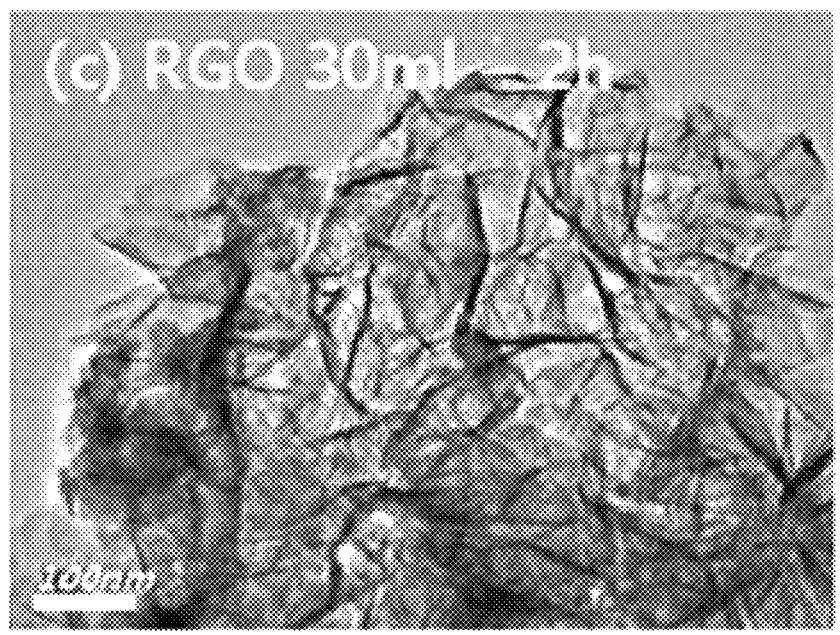
Figure 3D:
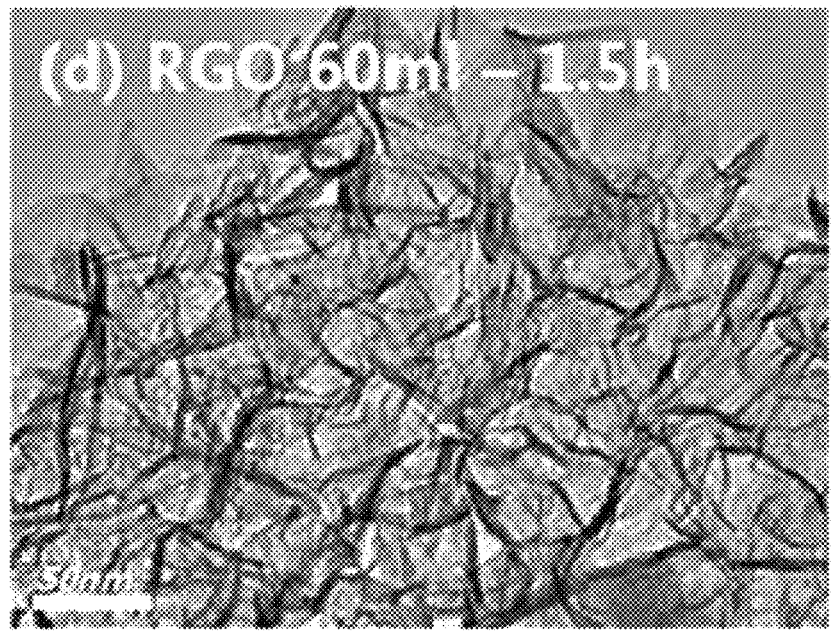
Figure 3E:
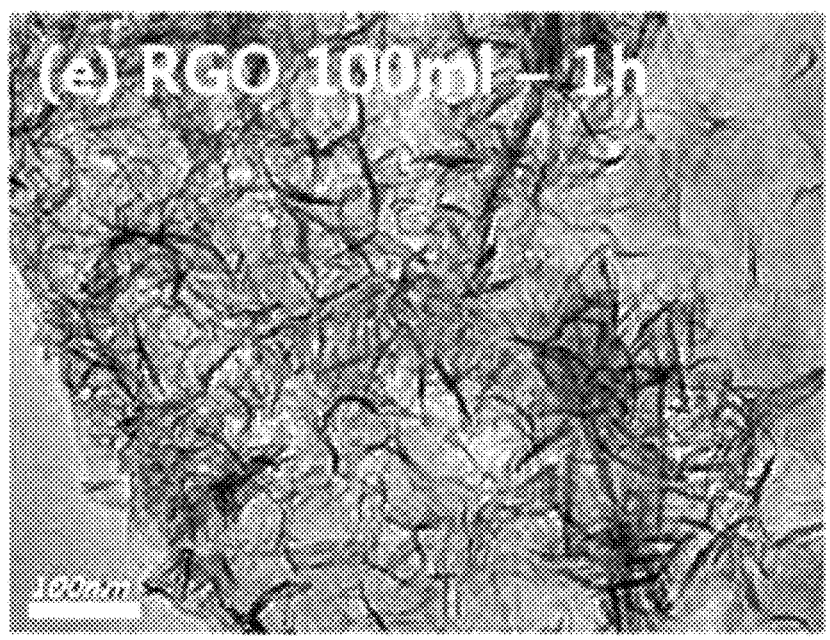

FIGS. 3A to 3E provide transmission electron microphotographs of products obtained by adding 0 ml, 10 ml, 30 ml, 60 ml, and 100 ml of graphene colloids to the manganese precursor $MnCO_3$, and then, reacting the precursor with the oxidizer for 1 to 24 hours. FIG. 3A shows a TEM image of a product (comparative example) obtained by only reacting the oxidizer and the manganese precursor for 24 hours without adding the graphene colloid. FIG. 3B shows a TEM image of a product obtained by adding 10 ml of the graphene colloid, and then, reacting the precursor with the oxidizer for 5 hours. FIG. 3C shows a TEM image of a product obtained by adding 30 ml of the graphene colloid, and then, reacting the precursor with the oxidizer for 2 hours. FIG. 3D shows a TEM image of a product obtained by adding 60 ml of the graphene colloid, and then, reacting the precursor with the oxidizer for 1.5 hours. FIG. 3E shows a TEM image of a product obtained by adding 100 ml of the graphene colloid, and then, reacting the precursor with the oxidizer for 1 hour. In the specimen synthesized by only reacting the oxidizer and the precursor without adding the graphene colloid, δ-$MnO_2$ in a plate shape having a thickness of 10 nm to 20 nm and a side surface length of ~200 nm was observed, as identified in the SEM result. In the specimen synthesized by adding the graphene colloid, two types of plates in different sizes are mixed each other in the form that thin plates are curled on a large plate having a side surface length of several micrometer. Considering that a side surface length of a graphene nano sheet corresponds to several micrometers, the material of the large plate in the TEM image is graphene, and the thin and curled plate thereon is δ-$MnO_2$. Thus, it was identified that the two materials co-exist forming a composite. In light of the results obtained through the XRD and the SEM, the graphene effectively reduces the reaction time required to form the manganese oxide nano structure, and furthermore, is mixed with the manganese oxide nano-structure to contribute to enhancing the physical property of the manganese oxide.

Figure 4A:
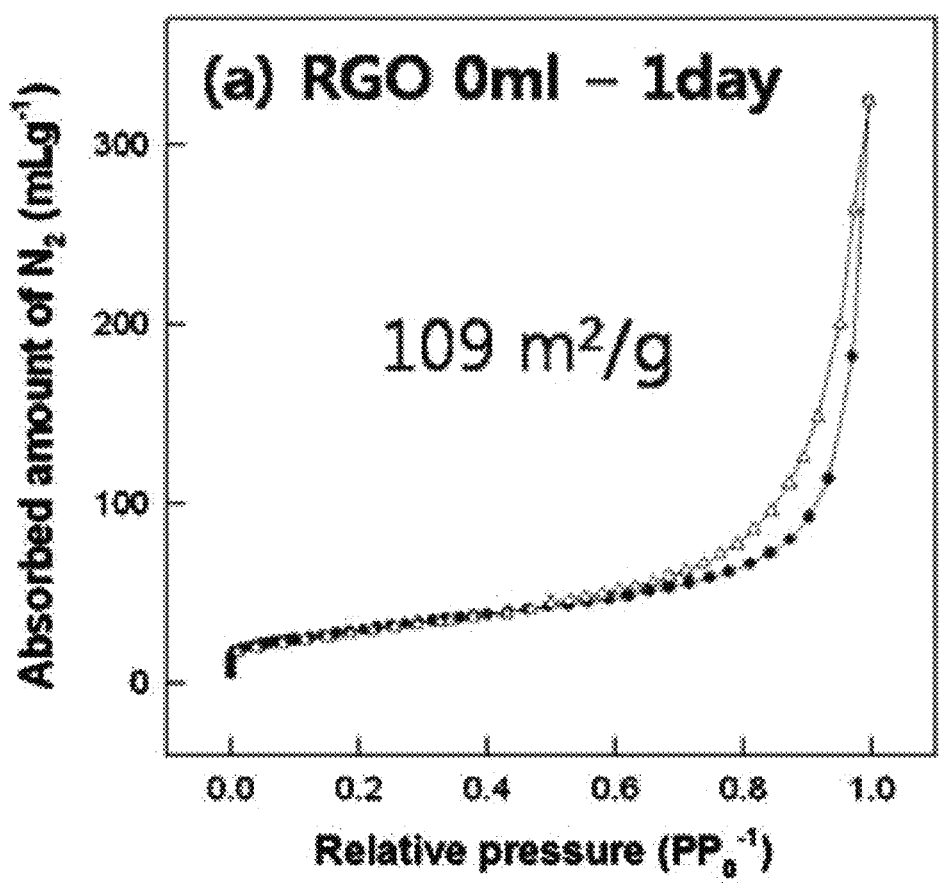
FIGS. 4A to 4E provide graphs showing nitrogen isotherm adsorption and desorption results for a manganese oxide/graphene nanocomposite in accordance with an illustrative embodiment of the present disclosure.
Figure 4B:
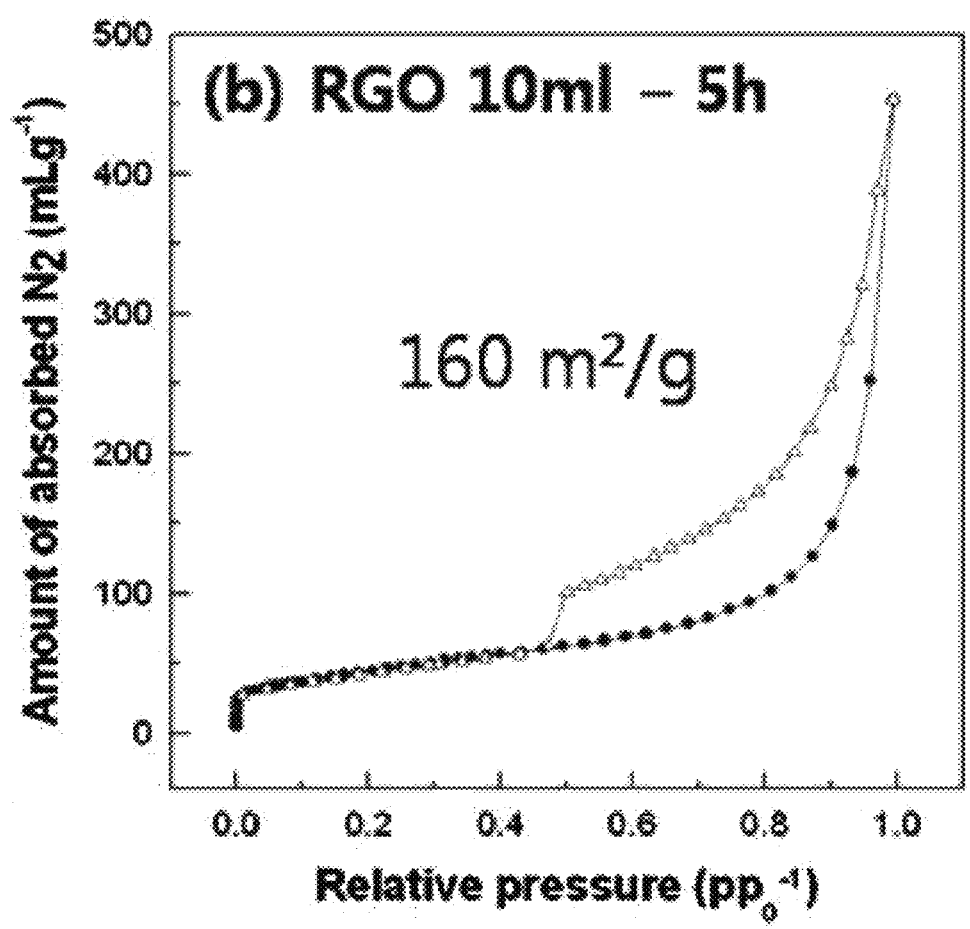
Figure 4C:
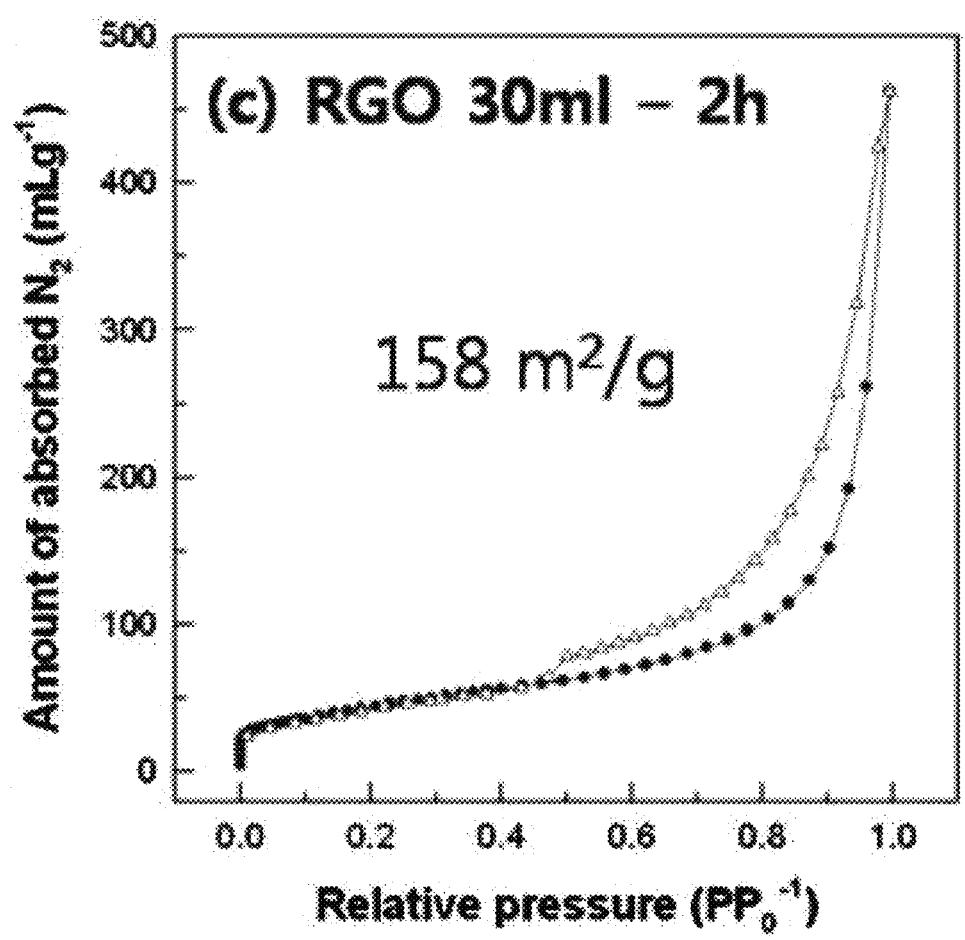
Figure 4D:
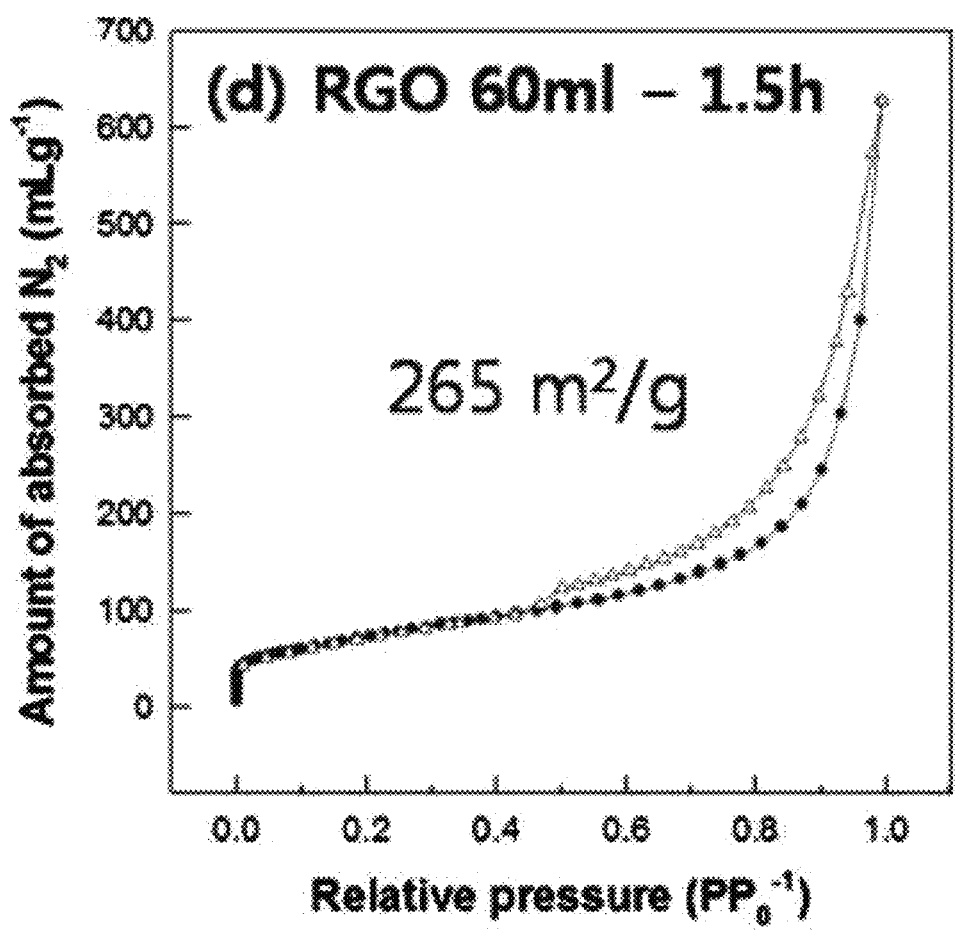
Figure 4E:
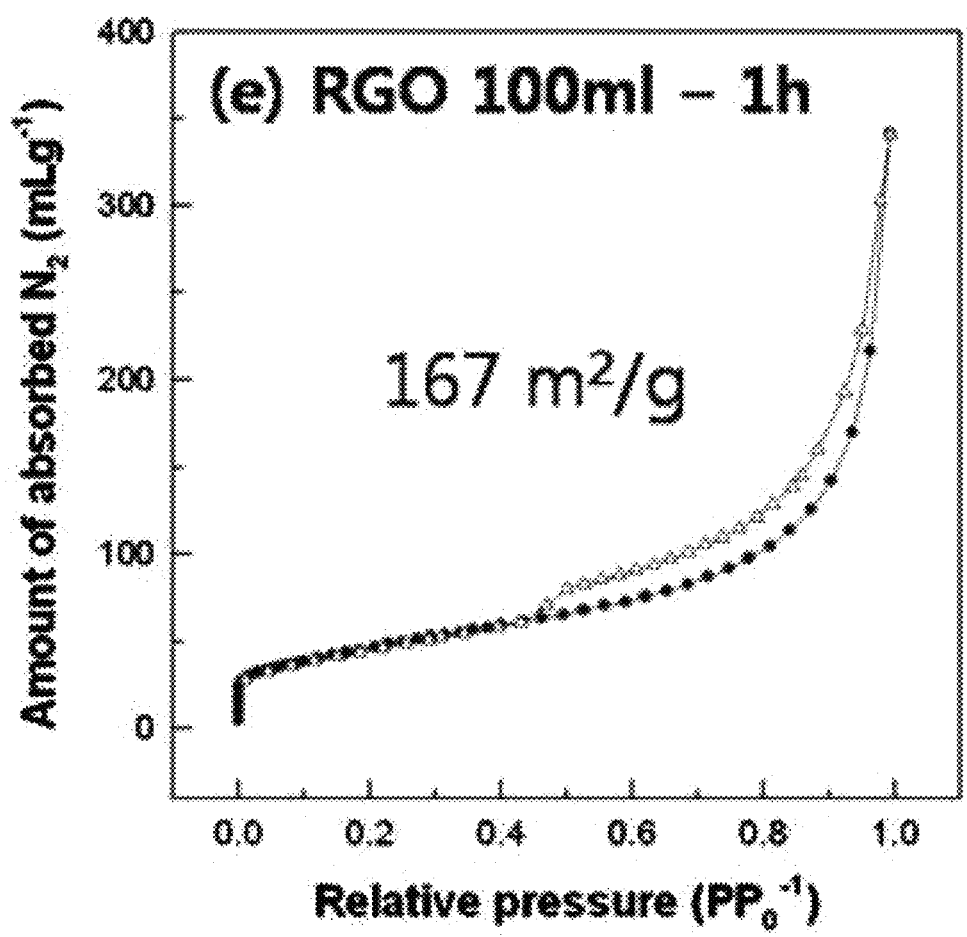

FIGS. 4A to 4E provide nitrogen isotherm adsorption and desorption photographs of products obtained by adding 0 ml, 10 ml, 30ml, 60ml, and 100ml of graphene colloids to the manganese precursor $MnCO_3$, and then, reacting the precursor with the oxidizer for 1 to 24 hours. FIG. 4A shows a BET result of a product (comparative example) obtained by only reacting the oxidizer and the manganese precursor for 24 hours without adding the graphene colloid. FIG. 4B shows a BET result of a product obtained by adding 10 ml of the graphene colloid, and then, reacting the precursor with the oxidizer for 5 hours. FIG. 4C shows a BET result of a product obtained by adding 30 ml of the graphene colloid, and then, reacting the precursor with the oxidizer for 2 hours. FIG. 4D shows a BET result of a product obtained by adding 60 ml of the graphene colloid, and then, reacting the precursor with the oxidizer for 1.5 hours. FIG. 4E shows a BET result of a product obtained by adding 100 ml of the graphene colloid, and then, reacting the precursor with the oxidizer for 1 hour. From the result of FIG. 4A, it was identified that the specific surface area of δ-$MnO_2$ synthesized without adding the graphene was relatively small with 77 $m^2/g$, whereas the specific surface areas of the specimens of FIGS. 4B to 4E, in which the graphene was added, drastically increased 2 to 3 times with 160 $m^2/g$ to 265 $m^2/g$. In general, as a specific surface area of a material is large, the material exhibits a more excellent characteristic when the material is used as an electrode material. In light of this point, the specimens prepared through the synthesis method of the present disclosure are expected to have a more excellent electrode characteristic than that of the specimen, in which only the manganese oxide is present.

Experimental Example 2

Electrochemical Measurement

Cyclic voltamogram (CV) of the manganese oxide/graphene nanocomposite of Example 1 and the manganese oxide of the comparative example was measured. The results were illustrated in FIGS. 5A to 5E. Specific capacitance values by cycles for the manganese oxide/graphene nanocomposite of Example 1 and the manganese oxide of the comparative example were calculated and illustrated in FIG. 6.

Figure 5A:
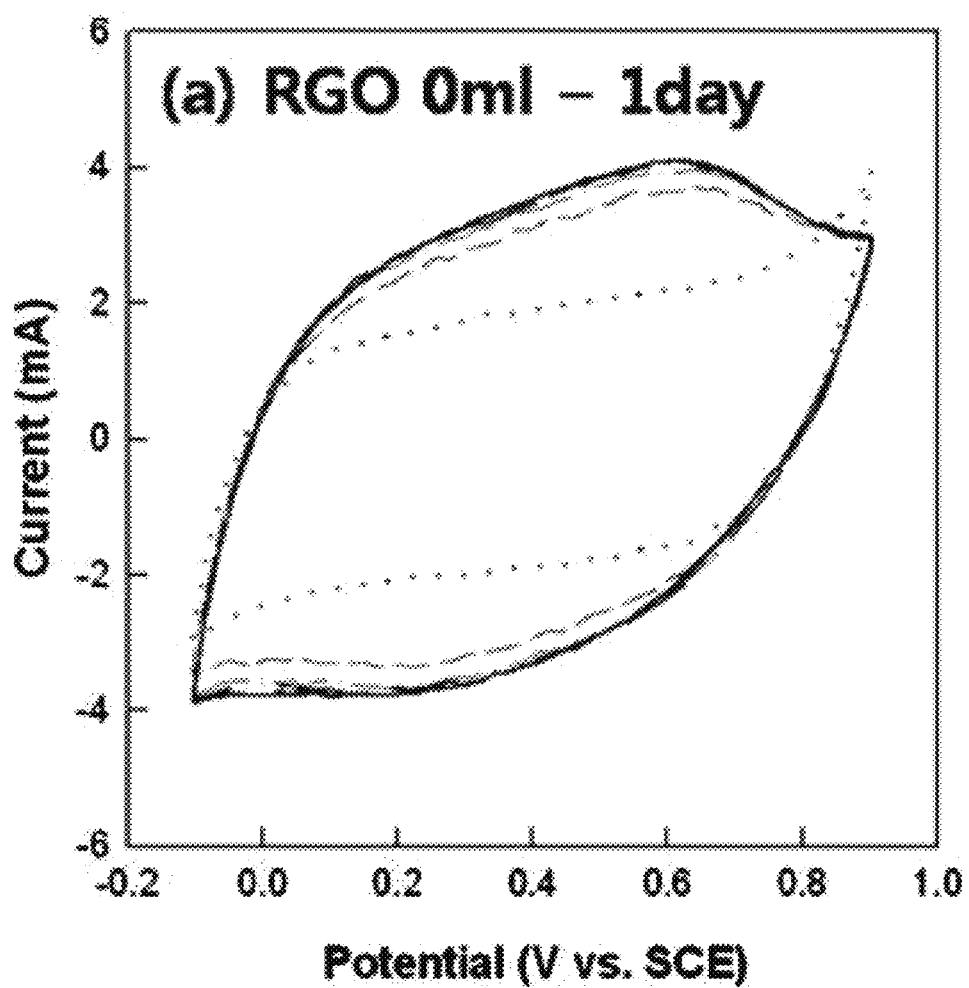
FIGS. 5A to 5E provide CV graphs of a manganese oxide/graphene nanocomposite in accordance with an illustrative embodiment of the present disclosure.
Figure 5B:
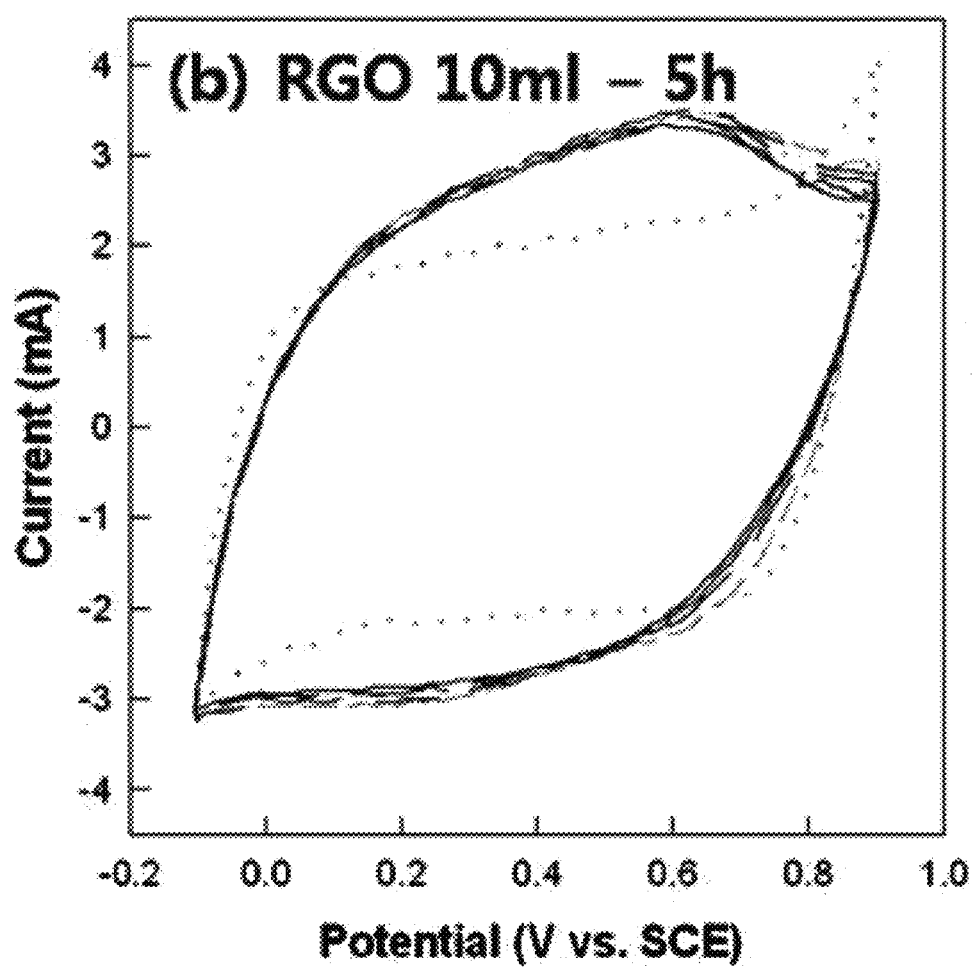
Figure 5C:
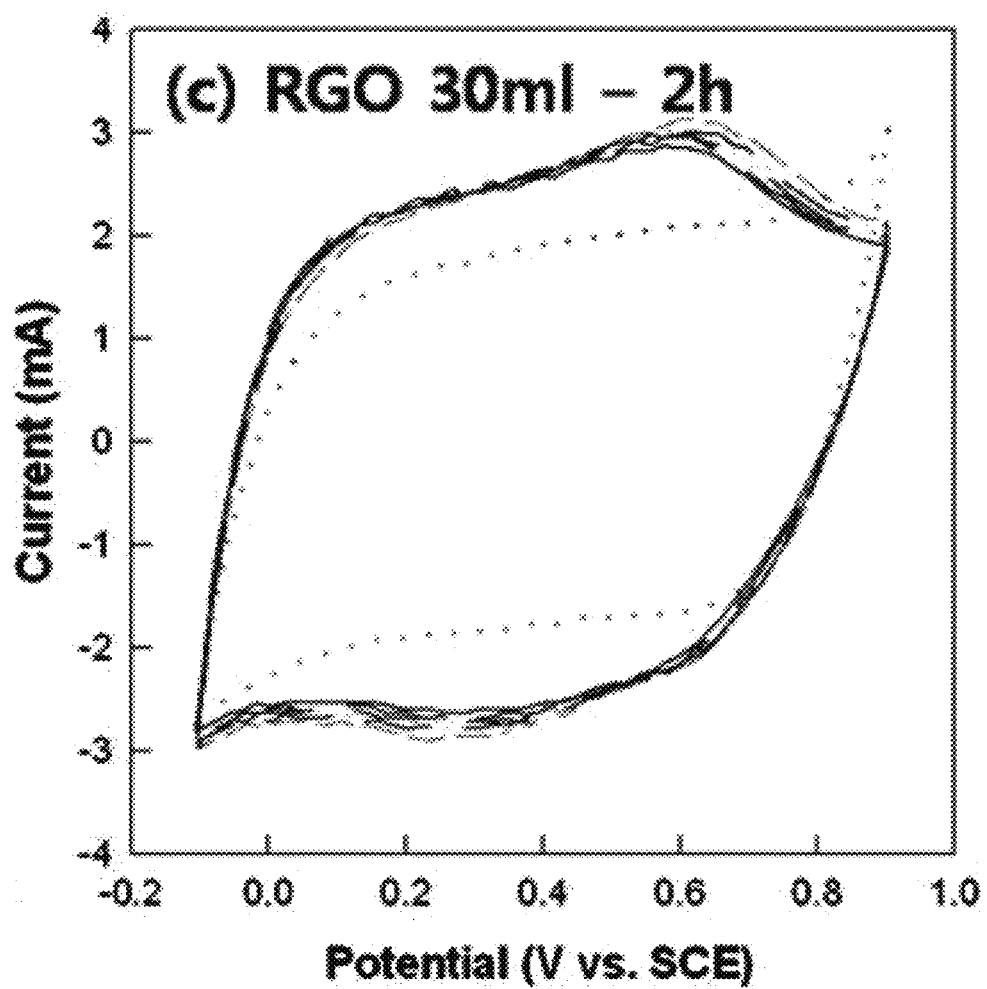
Figure 5D:
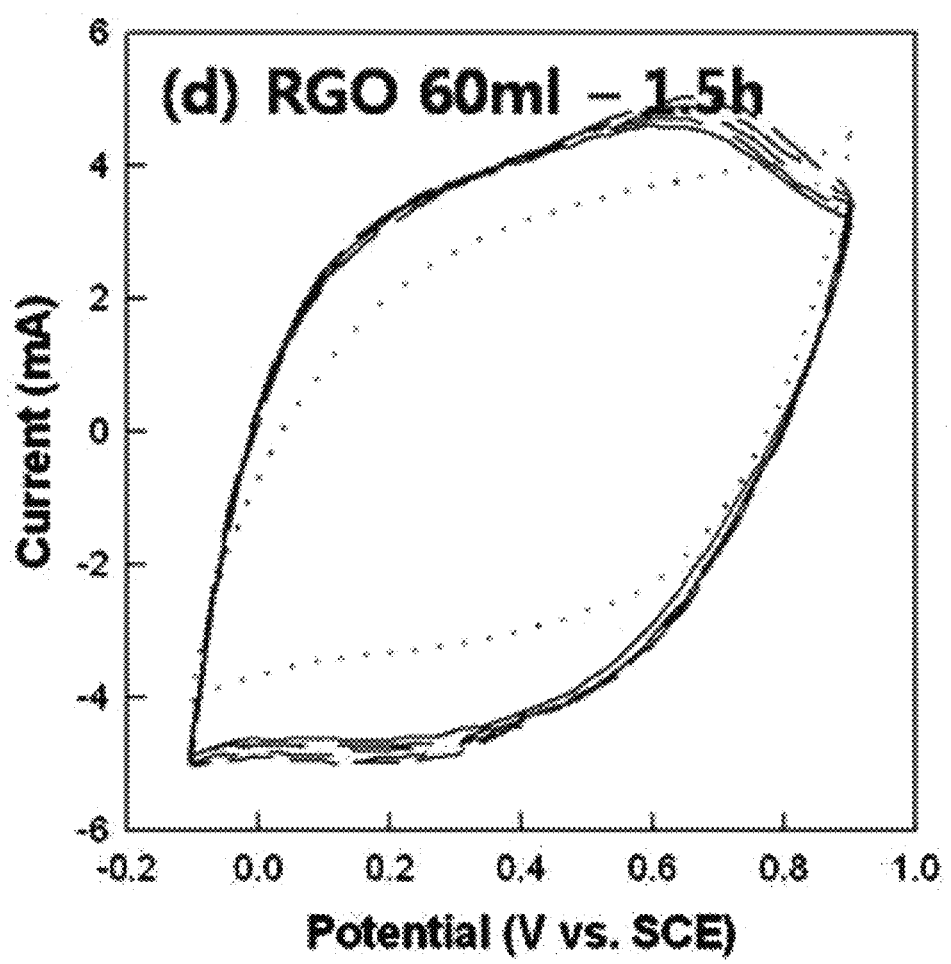
Figure 5E:
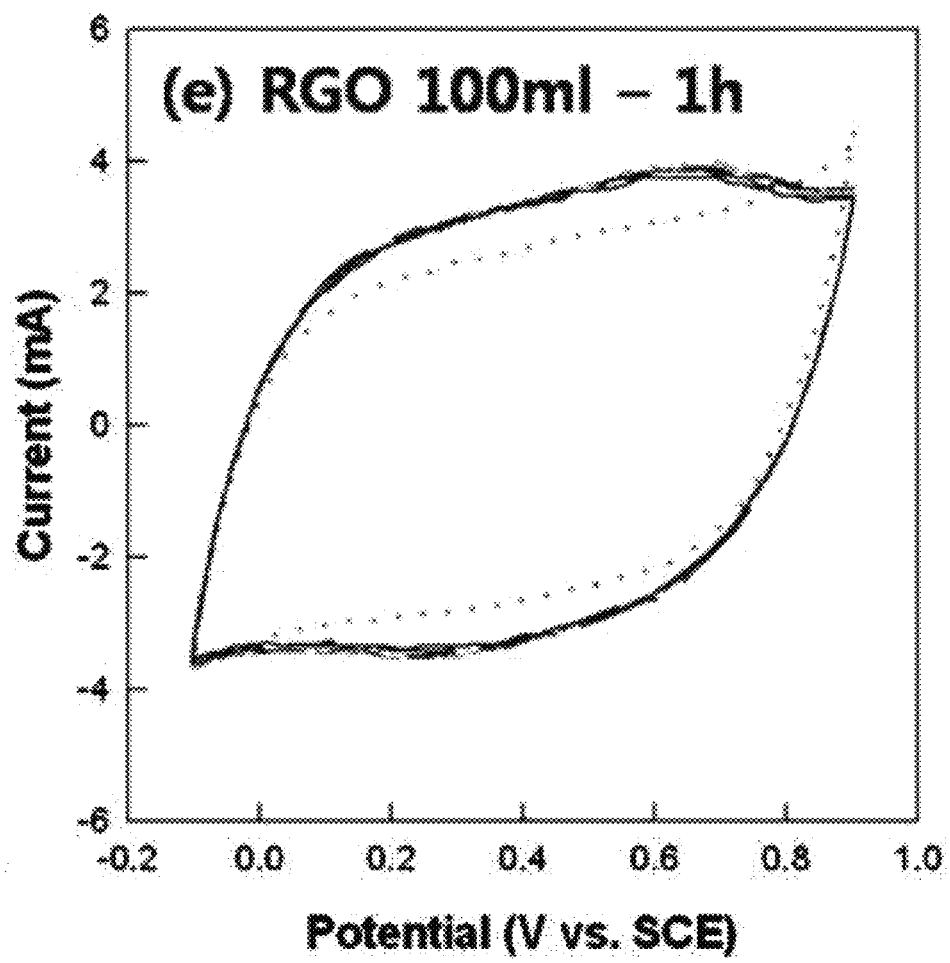
Figure 6:
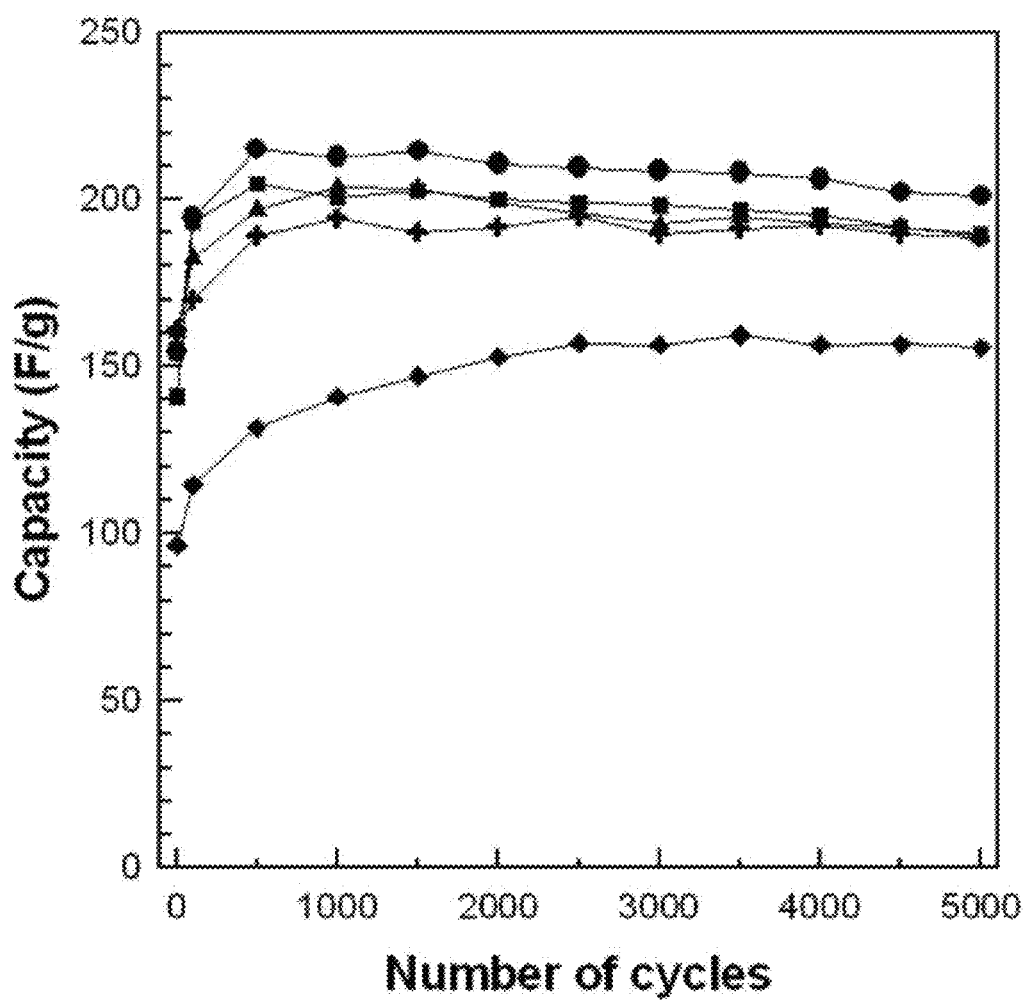
FIG. 6 is a graph showing a specific capacitance value of a manganese oxide/graphene nanocomposite in accordance with an illustrative embodiment of the present disclosure.

FIGS. 5A to 5E provide CV graphs of products obtained by adding 0 ml, 10 ml, 30 ml, 60 ml, and 100 ml of graphene colloids to the manganese precursor $MnCO_3$, and then, reacting the precursor with the oxidizer for 1 to 24 hours. FIG. 5A shows a CV result of a product (comparative example) obtained by only reacting the oxidizer and the manganese precursor for 24 hours without adding the graphene colloid. FIG. 5B shows a CV result of a product obtained by adding 10 ml of the graphene colloid, and then, reacting the precursor with the oxidizer for 5 hours. FIG. 5C shows a CV result of a product obtained by adding 30 ml of the graphene colloid, and then, reacting the precursor with the oxidizer for 2 hours. FIG. 5D shows a CV result of a product obtained by adding 60 ml of the graphene colloid, and then, reacting the precursor with the oxidizer for 1.5 hours. FIG. 5E shows a CV result of a product obtained by adding 100 ml of the graphene colloid, and then, reacting the precursor with the oxidizer for 1 hour. It was identified that all the synthesized specimens exhibit an aspect similar to a typical rectangle graph presented in a super-capacitor. In case of FIG. 5A, specific capacitance continuously increases from the first cycle and is stabilized at and after the $500^{th}$ cycle with an average value of 132 F/g. Also, in case of FIG. 5B, as the number of cycles is repeated, the specific capacitance value increases and then maintains at 189 F/g. In case of FIG. 5C, the specific capacitance value maintains at 222 F/g. In FIG. 5D, the specific capacitance value maintains at 204 F/g. In FIG. 5E, the specific capacitance value maintains at 189 F/g. A specific capacitance value by cycles for each of the specimens was calculated and illustrated in FIG. 6. In FIG. 6, the specimen, in which 0 ml of the graphene colloid was added, is indicated in a diamond shape. The specimen, in which 10 ml of the graphene colloid was added, is indicated in a triangle shape. The specimen, in which 30 ml of the graphene colloid was added, is indicated in a circular shape. The specimen, in which 60 ml of the graphene colloid was added, is indicated in a square shape. The specimen, in which 100 ml of the graphene colloid was added, is indicated in a cross shape. As aforementioned, all the synthesized specimens exhibit excellent electrode activity without causing reduction of the specific capacitance till the 5,000$^{th}$ cycle. In all the cycle areas, the specimens of FIGS. 5B to 5E, in which $\delta$-$MnO_2$ and the graphene are mixed with each other, have a larger specific capacitance value than that in the specimen of FIG. 5A, in which only $\delta$-$MnO_2$ is present. Thus, it was confirmed that the graphene-$\delta$-$MnO_2$ nanocomposite synthesized in this research can be used as an electrode material having an excellent characteristic as a super-capacitor.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. A method for producing a manganese oxide/graphene nanocomposite, comprising:
   mixing a manganese precursor and a graphene colloid;
   reacting the manganese precursor and the graphene colloid; in a liquid phase to obtain a reaction solution at room temperature in the absence of a surfactant; and
   adding an oxidizer to the reaction solution to react the reaction solution with the oxidizer for 6 hours or less at room temperature to produce the manganese oxide/graphene nanocomposite.

2. The method for producing a manganese oxide/graphene nanocomposite of claim 1,
   wherein the manganese precursor includes a precursor containing divalent manganese.

3. The method for producing a manganese oxide/graphene nanocomposite of claim 1,
   wherein the oxidizer includes one selected from the group consisting of $(NH_4)_2S_2O_8$, $Li_2S_2O_8$, $Na_2S_2O_8$, $K_2S_2O_8$ and a combination thereof.

4. The method for producing a manganese oxide/graphene nanocomposite of claim 1,
   wherein the method further comprises a step of centrifuging the reaction solution reacted by adding the oxidizer to wash the reacted manganese oxide/graphene nanocomposite.

5. The method for producing a manganese oxide/graphene nanocomposite of claim 4,
   wherein the method further comprises a step of drying the reacted manganese oxide/graphene nanocomposite after the step of centrifuging.

6. The method for producing a manganese oxide/graphene nanocomposite of claim 1,
   wherein the oxidizer is added at a mole ratio of 1:1 to 5 with respect to the manganese precursor.

7. The method for producing a manganese oxide/graphene nanocomposite of claim 1,
   wherein the graphene includes a pristine graphene, a reduced graphene oxide (RGO), or a combination thereof.

8. The method for producing a manganese oxide/graphene nanocomposite of claim 1,
   wherein the manganese oxide of the manganese oxide/graphene nanocomposite includes $\delta$-$Mno_2$.

9. The method for producing a manganese oxide/graphene nanocomposite of claim 1,
   wherein the manganese oxide/graphene nanocomposite is in a plate shape.

* * * * *